(12) United States Patent
Zhang et al.

(10) Patent No.: US 8,733,171 B2
(45) Date of Patent: May 27, 2014

(54) COMPENSATING FREQUENCY MISMATCH IN GYROSCOPES

(75) Inventors: Wenhua Zhang, Sunnyvale, CA (US); Robert G. Walmsley, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 391 days.

(21) Appl. No.: 13/119,928

(22) PCT Filed: Oct. 31, 2008

(86) PCT No.: PCT/US2008/081985
§ 371 (c)(1),
(2), (4) Date: Mar. 18, 2011

(87) PCT Pub. No.: WO2010/050967
PCT Pub. Date: May 6, 2010

(65) Prior Publication Data
US 2011/0179866 A1     Jul. 28, 2011

(51) Int. Cl.
*G01C 19/56* (2012.01)
(52) U.S. Cl.
USPC .................................. 73/504.12; 73/1.37
(58) Field of Classification Search
USPC .................. 73/1.37, 1.77, 504.12, 504.14
See application file for complete search history.

(56) References Cited

U.S. PATENT DOCUMENTS

| | | | |
|---|---|---|---|
| 6,240,780 B1 * | 6/2001 | Negoro et al. | 73/504.12 |
| 7,197,928 B2 * | 4/2007 | Chen et al. | 73/504.04 |
| 8,272,266 B2 * | 9/2012 | Zhang et al. | 73/504.12 |
| 8,327,684 B2 * | 12/2012 | DeNatale et al. | 73/1.37 |

FOREIGN PATENT DOCUMENTS

| | | |
|---|---|---|
| JP | 5-312576 | * 11/1993 |
| JP | 08-178674 | 7/1996 |
| JP | 10-132573 | 5/1998 |
| JP | 2004-093158 | 3/2004 |
| KR | 10-0825626 | 4/2008 |

* cited by examiner

*Primary Examiner* — John Chapman, Jr.

(57) ABSTRACT

Gyroscopes that can compensate frequency mismatch are provided. In this regard, a representative gyroscope, among others, includes a top substrate including an outermost structure, a first driving structure and a first sensing structure. The first driving structure and the first sensing structure are disposed within the outermost structure. The first driving structure and the first sensing structure include a first driving electrode and a first sensing electrode that are disposed on a bottom surface of the first driving structure and first sensing structure, respectively. A portion of the mass on the top surface of the first sensing structure is removed. The gyroscope further includes a bottom substrate that is disposed below the top substrate. The bottom substrate includes a second driving electrode and a second sensing electrode that are disposed on a top surface of the bottom substrate and below the first driving electrode and the first sensing electrode.

11 Claims, 4 Drawing Sheets

COMPENSATING FREQUENCY MISMATCH IN GYROSCOPES

TECHNICAL FIELD

The present disclosure relates to gyroscopes, and more particularly, the disclosure relates to compensating frequency mismatch in microelectromechanical systems (MEMS) gyroscopes.

BACKGROUND

Gyroscopes are devices that measure or maintain orientation based on principles of angular momentum. Gyroscopes can be used in many applications, such as, vehicle stability control, rollover detection, navigation, load leveling/suspension control, computer input devices, handheld computing devices, game controllers, navigation of autonomous guided vehicles, etc. Fabrication imperfections of the gyroscopes typically result in an oscillation frequency mismatch between two vibrating modes. These fabrication imperfections decrease the performance of the gyroscopes and may cause erroneous output.

SUMMARY

Gyroscopes that can compensate for oscillation frequency mismatch are provided. In this regard, a representative gyroscope, among others, includes a top substrate including an outermost structure, a first driving structure and a first sensing structure. The first driving structure and the first sensing structure are disposed within the outermost structure. The first driving structure and the first sensing structure include a first driving electrode and a first sensing electrode that are disposed on a bottom surface of the first driving structure and the first sensing structure, respectively. A portion of the mass on the top surface of the first sensing structure is removed.

The gyroscope further includes a bottom substrate that is disposed below the top substrate. The bottom substrate includes a second driving electrode and a second sensing electrode that are disposed on a top surface of the bottom substrate and below the first driving electrode and the first sensing electrode.

The present invention can also be viewed as providing methods for making a gyroscope that can compensate for frequency mismatch. In this regard, one embodiment of such a method, among others, can be broadly summarized by the following steps: providing a top substrate and a bottom substrate, as described above, and removing a portion of the mass on the top surface of a first sensing structure of the top substrate. The removal of the mass can be accomplished at a certain mass removal area. The method further includes placing the mass removal area that is on the top surface of the first driving structure close to the center of the gyroscope. Other systems, methods, features, and advantages of the present invention will be or become apparent to one with skill in the art upon examination of the following drawings and detailed description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which frequency mismatch in a gyroscope can be compensated. The disclosure focuses on controllable mode frequency match in microelectromechanical systems (MEMS) gyroscopes where surface electrode technology is used.

Figure 1:
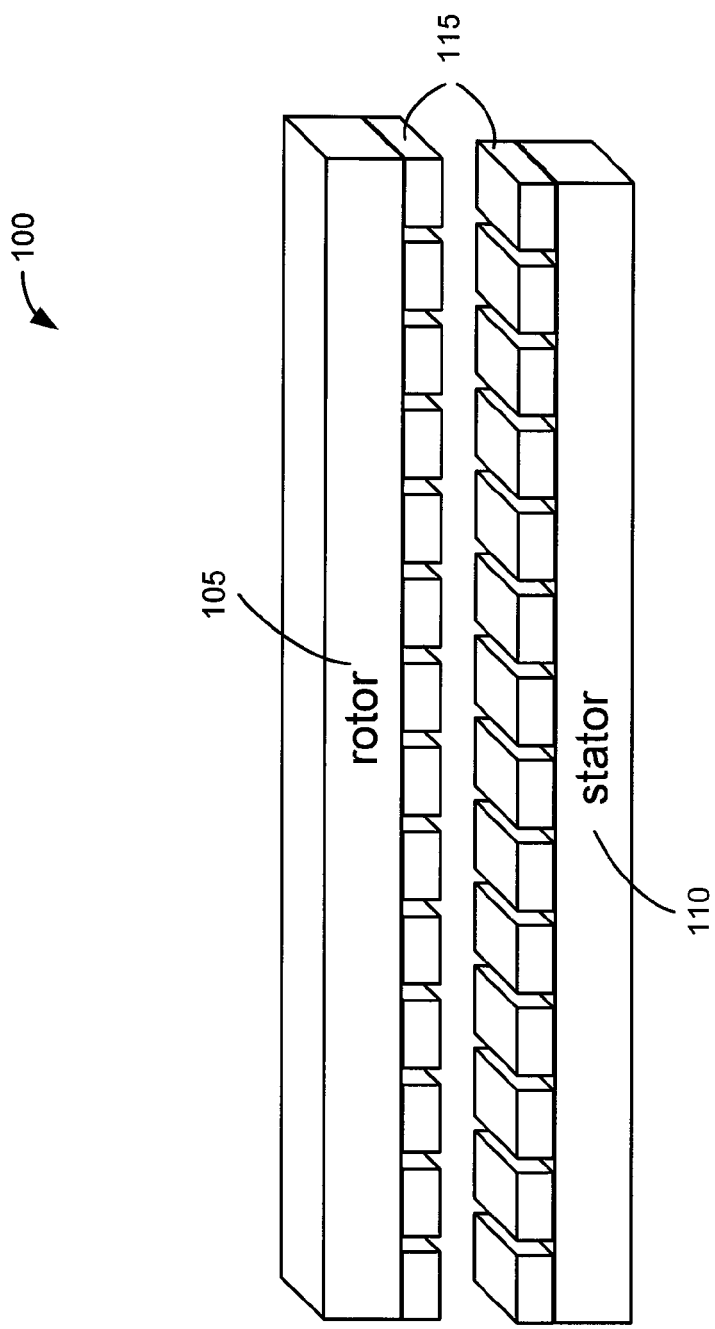
FIG. 1 is a side view of an embodiment of surface electrodes that can be used in a gyroscope.

FIG. 1 is a side view of an embodiment of surface electrodes 100 that can be used in a gyroscope. In general, electrodes 115 are attached to opposite substrates 105, 110 facing each other. Electrostatic force from substrates 105, 110 can be used to move the electrodes 115 on the opposite substrates 105, 110, respectively, while capacitance that changes between the electrodes 115 during motion provides capacitance signal to detect the motion. On each of the substrates 105, 110, the electrodes 115 may form several groups depending on specific applications, so that a voltage pattern can be applied to the electrodes 115 and the pattern can alternate periodically in the moving direction.

Figure 2:
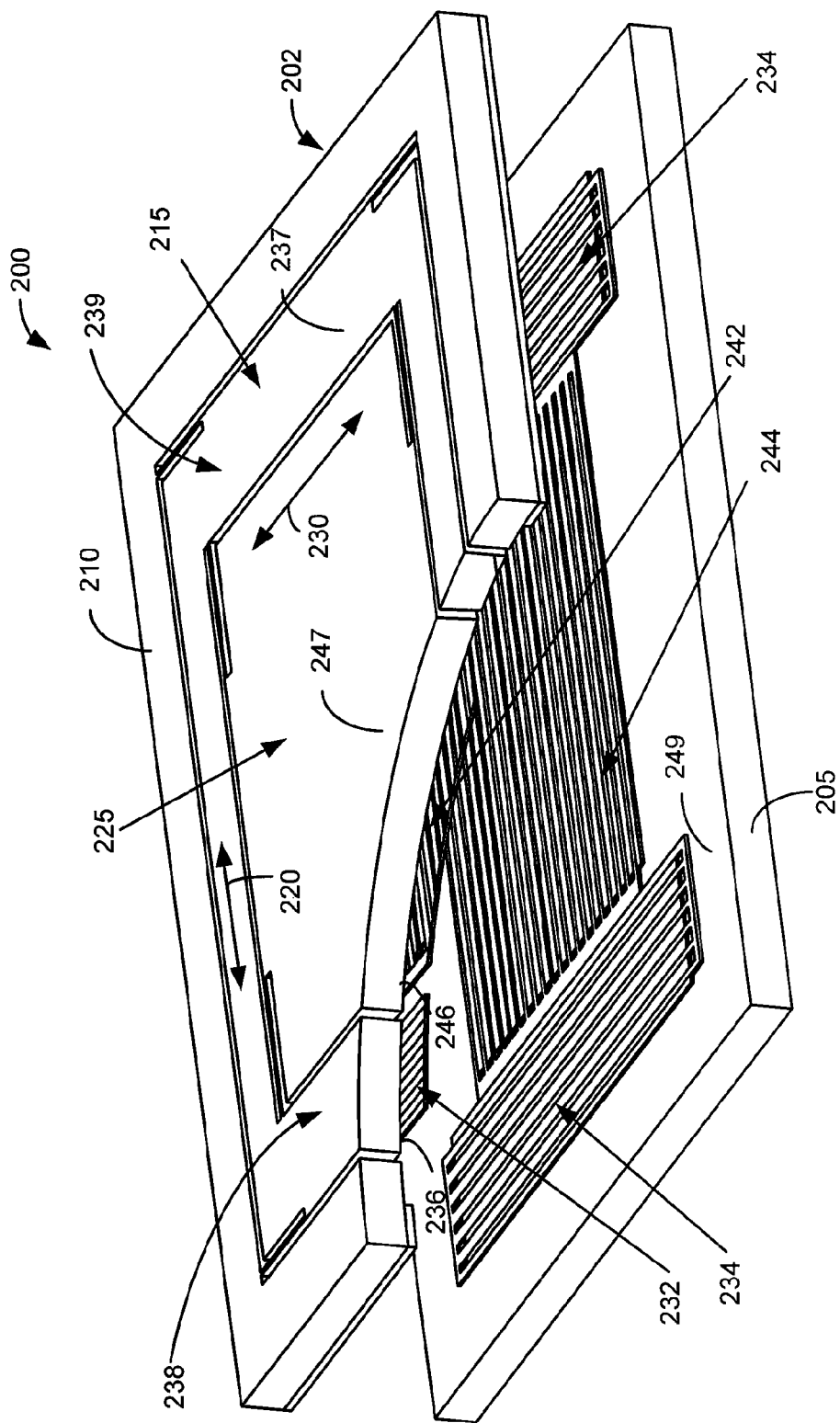
FIG. 2 is a schematic drawing of an embodiment of a gyroscope, such as that shown in FIG. 1.

FIG. 2 is a schematic drawing of an embodiment of a gyroscope 200, such as that shown in FIG. 1. The gyroscope 200 includes a top substrate 202 and a bottom substrate 205. The top substrate 202 includes an outermost structure 210, one or more sensing structures 215, and one or more driving structures 225. In this example, the outermost structure 210 and the sensing structure 215 are open and enclosed similar to that of a window frame. The outermost structure 210 is generally fixed and does not move. The sensing structure 215 and the driving structure 225 are disposed within and supported to the outermost structure 210 and the sensing structure 215 using microbeams 350A-H (FIG. 3), respectively.

The sensing structure 215 includes first sensing electrodes 232 that are disposed on a bottom surface 236 of the sensing structure 215 and aligned parallel to at least one side wall 238, 239 of the sensing structure 215. In this example, the first sensing electrodes 232 are disposed at the left and right side walls 238, 239 of the sensing structure 215. The driving structure 225 includes first driving electrodes 242 that are disposed on a bottom surface 246 of the driving structure 225. The first driving electrodes 242 are disposed adjacent and perpendicular to the first sensing electrodes 232.

The bottom substrate 205 is disposed below a top substrate 202 and includes second sensing electrodes 234 and second driving electrodes 244 that are disposed on a top surface 249 of the bottom substrate 205 and below the first sensing electrodes 232 and the first driving electrodes 242. The first and second sensing electrodes 232, 234 and the first and second driving electrodes 242, 244 provide a capacitance signal based on the movement of the sensing structure 215 and the driving structure 225, respectively. The capacitance signal is generated based on the sensing structure 215 and driving structure 225 moving perpendicular to the second sensing electrodes 234 and second driving electrodes 244 in the horizontal direction 220 and vertical direction 230, respectively.

The first sensing electrodes 232 between the driving structure 225 and the outermost structure 210 provide electrostatic force to move the driving structure 225 when certain voltage pattern is applied. The second sensing electrodes 234 between the sensing structure 215 and the bottom substrate 205 provide capacitance signal when the sensing structure 215 is moving. As the driving structure 225 moves at a certain velocity back and forth, a Coriolis force generally appears when the whole gyroscope 200 rotates. The Coriolis force moves the sensing structure 215 since the driving structure 225 is coupled to the sensing structure 215. By capacitively detecting the sensing structure movement using the sensing electrodes 232, 234, the rotational signal can be detected.

The sensing structure 215 and driving structure 225 are generally a mass-damping-spring system. The dynamic mode of the sensing structure 215 and driving structure 225 can be translational or rotational, which depends on the operational principles. The driving and sensing mechanism may use two-phase, three-phase or some other driving mechanism. The driving structure 225 generally moves to a certain velocity at a certain frequency. The sensing structure 215 generally detects the signal of the movement of the sensing structure 215. Alternatively or additionally, the sensing structure 215 and the driving structure 225 of the gyroscope 200 can be a single sensing structure 215 and a single driving structure 225 or a combination of identical or different sensing structures 215 and a combination of identical or different driving structures 225. In case of multiple sensing structures 215 and the driving structures 225, they can be independent, or coupled. The coupling mechanism may implement electrostatic/mechanical methods.

When the gyroscope 200 is subjected to an angular velocity, the Coriolis effect transfers energy from the driving structure 225 to the sensing structure 215. The response of the sensing structure 215 provides information about the resultant angular motion. The efficiency of the energy transfer increases by matching the frequencies of oscillation of the sensing structures 215 and the driving structures 225. The frequencies of the sensing structures 215 and the driving structures 225 can be matched by removing some mass from top surfaces 237, 247 of either the sensing structures 215 or the driving structures 225, respectively, or both. The mass from the top surfaces 237, 247 can be removed to certain depth using deep etch, which is described further in relation to FIG. 3.

Figure 3:
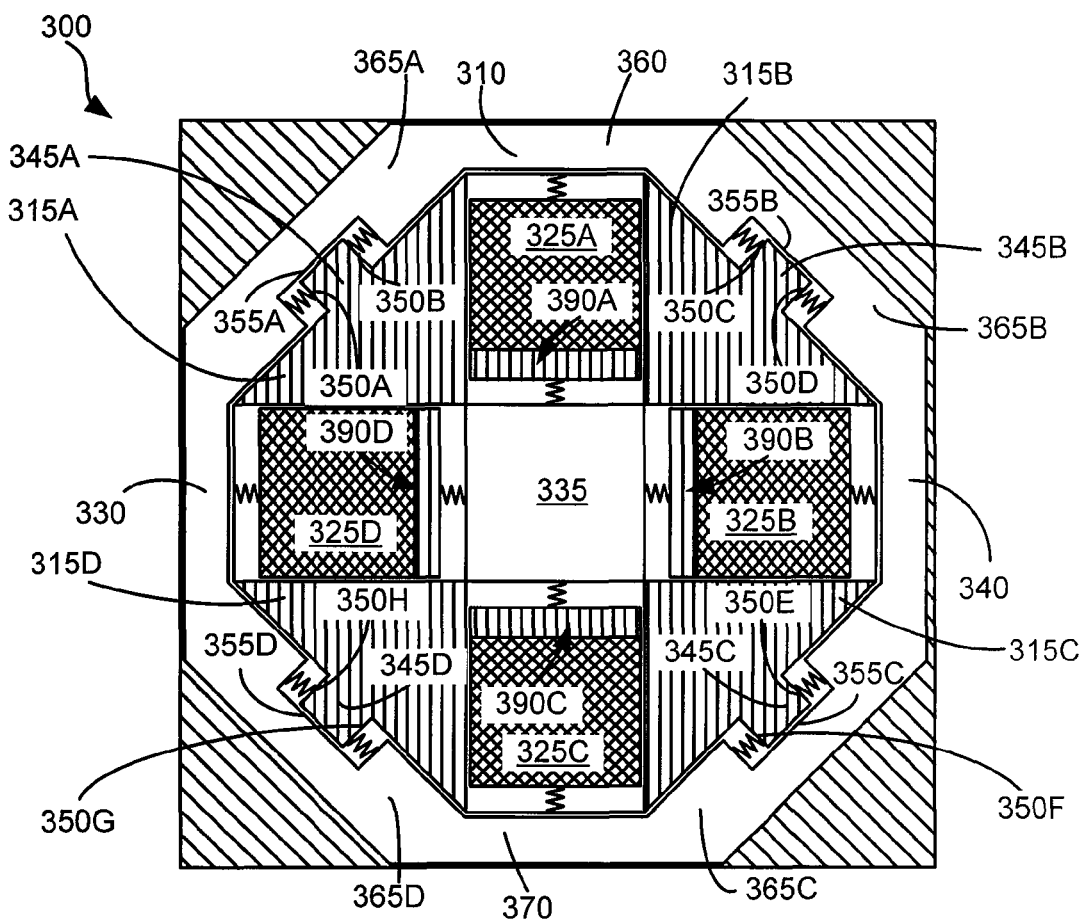
FIG. 3 is a top view of yet another embodiment of a gyroscope, such as that shown in FIG. 2, that can compensate for frequency mismatch.

FIG. 3 is a top view of yet another embodiment of a gyroscope, such as that shown in FIG. 2, and is denoted generally by reference numeral 300. The gyroscope 300 includes an outermost structure 310 having an octagon shape. The gyroscope 300 further includes first, second, third, and fourth driving structures 325A-D, and first, second, third and fourth sensing structures 315A-D, all of which are disposed within the outermost structure 310. The first and third driving structures 325A, C that are disposed between the first and second sensing structures 315A, B and the third and fourth sensing structures 315C, D, respectively. The first and third driving structures 325A, C are disposed adjacent to top wall 360 and bottom wall 370, respectively. The first, second, third, and fourth sensing structures 315A-D are disposed adjacent to diagonal sides 365A-D, respectively.

The second driving structure 325B and fourth driving structure 325D are further disposed between the second and third sensing structures 315B, C, and the fourth and first sensing structures 315D, A, respectively. A center member 335 is disposed between the sensing structures 315A-D and driving structures 325A-D. The diagonal sides 365A-D include female members 355A-D that engage with the male members 345A-D using microbeams 350A-H, respectively. The male members 345A-D extend diagonally towards the female members 355A-D, respectively.

The first, second, third, and fourth sensing structures 315A-D include first, second, third, and fourth sensing electrodes (not shown), respectively. The first, second, third, and fourth sensing electrodes are aligned substantially diagonally from the top left, top right, bottom right, and bottom left, respectively, toward the center of the top substrate. The first sensing electrodes are opposite from the third sensing electrodes and the second sensing electrodes are opposite from the fourth sensing electrodes.

The first, second, third, and fourth driving structures 325A-D include first, second, third, and fourth driving electrodes (not shown) that aligned parallel to the top wall 360, right side wall 340, bottom wall 370 and left side wall 330 of the outermost structure 310, respectively. The fourth and second driving structures 325D, B move in the X-axis direction, and the first and third driving structures 325A, C move in the Y-axis direction. The sensing structures 315A-D move rotationally and measure the rotational rate about the Z-axis.

In this example, the performance of the gyroscope 300 can be improved by removing mass from the top surface 237 of the sensing structures 315A-D. However, there is a potential difficulty in controlling the exact depth in removing mass using, for example, deep etch, resulting in a variation of resonance frequencies of the sensing structures 215 and a mismatch of the frequencies between the sensing structures 315A-D and the driving structures 325A-D.

The frequency matching can be improved by removing mass from the top surface 247 (FIG. 2) in each driving structures 325A-D at certain mass removal areas 390A-D. Such mass removal areas 390A-D are designed and arranged to be adjacent to the center member 335. The amount of the area and the location of the area depend on the device geometric parameters. Since the mass removal areas 390A-D in the driving structures 325A-D are close to the center of the gyroscope 300, the areas 390A-D potentially have little affect on the rotational inertia of the sensing structures 315A-D and the resonance frequency of the sensing structures 315A-D. However, the mass removal areas 390A-D can change the frequencies of the driving structures 325A-D such that the areas 390A-D facilitate matching the driving and sensing frequencies to vary in the same rate as the etching depth varies at the sensing structures 315A-D.

Figure 4:
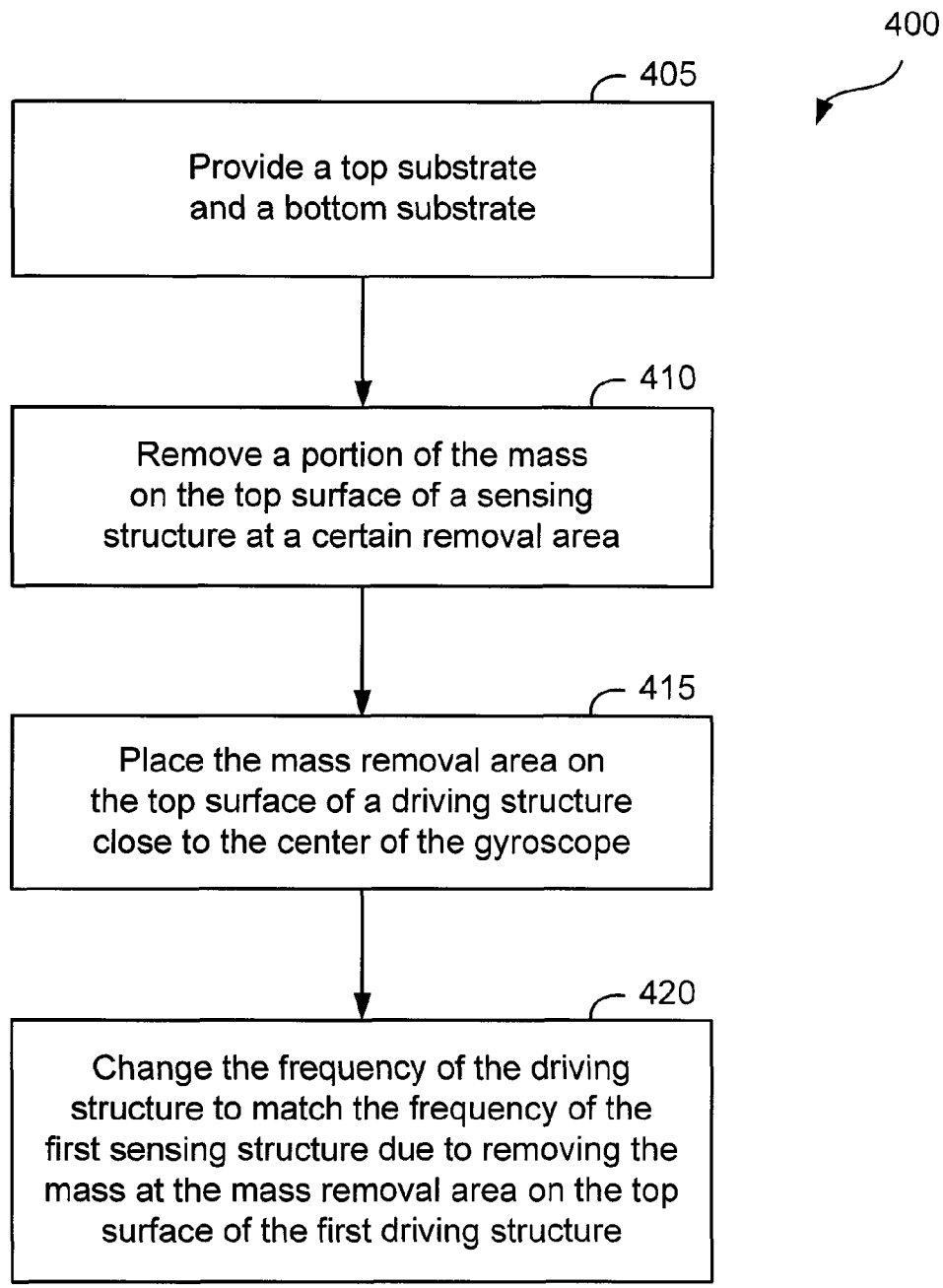
FIG. 4 is a flow diagram that illustrates an embodiment of a method for making a gyroscope, such as that shown in FIG. 2, that can compensate for frequency mismatch.

FIG. 4 is a flow diagram that illustrates an embodiment of a method for making a gyroscope, such as that shown in FIG. 2, that can compensate for frequency mismatch. Beginning with step 405, the method 400 provides a top substrate 202 (FIG. 2) and a bottom substrate 205 (FIG. 2). The top substrate 202 includes at least one driving structure 225 and at least one sensing structure 215. At step 410, a portion of the mass on the top surface 237 of the sensing structure 215 is removed and can be accomplished at certain mass removal areas 390 (FIG. 3). At step 415, the mass removal area 390 on the top surface 247 of the driving structure 225 is placed close to the center of the gyroscope. At step 420, the frequency of the driving structure 225 is changed to match the frequency of the sensing structure 215 due to removing the mass at the mass removal area 390 on the top surface 247 of the driving structure 225.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as is suited to the particular use contemplated. All such modifications and variation are within the scope of this disclosure, as determined by the appended claims when interpreted in accordance with the breadth to which they are fairly and legally entitled.

What is claimed:

1. A gyroscope that compensates frequency mismatch comprising:
    a top substrate including an outermost structure having a octagon shape, a first driving structure, a second driving structure, a third second driving structure, and a fourth driving structure and a first sensing structure, a second sensing structure, a third sensing structure, and a fourth sensing structure, the first, second, third, and fourth driving structures and the first, second, third, and fourth sensing structures being disposed within the outermost structure, the outermost structure being open and enclosing the first driving structure and the first sensing structure, the first driving structure and the first sensing structure including a first driving electrode and a first sensing electrode that are disposed on a bottom surface of the first driving structure and first sensing structure, respectively, a portion of the mass on the top surface of the first sensing structure being removed; and
    a bottom substrate that is disposed below the top substrate, the bottom substrate including a second driving electrode and a second sensing electrode that are disposed on a top surface of the bottom substrate and below the first driving electrode and the first sensing electrode.

2. The gyroscope as defined in claim 1, wherein a portion of the mass at a certain mass removal area on the top surface of the first driving structure has been removed.

3. The gyroscope as defined in claim 2, wherein tile mass removal area that is on the top surface of the first driving structure is placed close to the center of the gyroscope.

4. The gyroscope as defined in claim 2, wherein the removal of mass at the mass removal area on the top surface of the first driving structure changes the frequency of the driving structure to match the frequency of the first sensing structure.

5. The gyroscope as defined in claim 1, further comprising the first, second, third, and fourth sensing structures being disposed at the top left, top right, bottom right, and bottom left, respectively, the first driving structure being disposed between the first sensing structure and the second sensing structure, the second driving structure being disposed between the second sensing structure and the third sensing structure, the third driving structure being disposed between the third sensing structure and the fourth sensing structure, the fourth driving structure being disposed between the first sensing structure and the fourth sensing structure, the first driving structure being further disposed opposite from the third driving structure, the second driving structure being further disposed opposite from the fourth driving structure.

6. The gyroscope as defined in claim 5, wherein a portion of the mass at certain mass removal areas on the top surfaces of the first, second, third, and fourth driving structures is removed.

7. The gyroscope as defined in claim 6, wherein the mass removal areas on the top surfaces of the first, second, third, and fourth driving structures are close to the center of the gyroscope.

8. A method for making a gyroscope that can compensate for frequency mismatch comprising:
    providing a top substrate and a bottom substrate, the top substrate including an outermost structure having an a octagon shape, a first driving structure, a second driving structure, a third second driving structure, and a fourth driving structure and a first sensing structure, a second sensing structure, a third sensing structure, and a fourth sensing structure, the first, second, third, and fourth driving structures and the first, second, third, and fourth sensing structures being disposed within the outermost structure, the outermost structure being open and enclosing the first driving structure and the first sensing structure, the first driving structure and the first sensing structure including a first driving electrode and a first sensing electrode that are disposed on a bottom surface of the first driving structure and the first sensing structure, respectively; and
    removing a portion of the mass on the top surface of the first sensing structure.

9. The method as defined in claim 8, wherein removing the portion of the mass on the top surface of the first sensing structure is accomplished at a certain mass removal area.

10. The method as defined in claim 9, further comprising removing mass from an area that is on the top surface of the first driving structure close to the center of the gyroscope.

11. The method as defined in claim 10, further comprising changing the frequency of the first driving structure to match the frequency of the first sensing structure due to removing the mass at the mass removal area on the top surface of the first driving structure.

* * * * *

UNITED STATES PATENT AND TRADEMARK OFFICE
CERTIFICATE OF CORRECTION

PATENT NO. : 8,733,171 B2  Page 1 of 1
APPLICATION NO. : 13/119928
DATED : May 27, 2014
INVENTOR(S) : Zhang et al.

It is certified that error appears in the above-identified patent and that said Letters Patent is hereby corrected as shown below:

In the Claims

Column 5, line 23, Claim 1, delete "third second" and insert -- third --, therefor.

Column 5, line 45, Claim 3, delete "tile" and insert -- the --, therefor.

Column 6, line 25, Claim 8, delete "an a" and insert -- an --, therefor.

Column 6, line 27, Claim 8, delete "second driving" and insert -- driving --, therefor.

Signed and Sealed this
Ninth Day of December, 2014

Michelle K. Lee
*Deputy Director of the United States Patent and Trademark Office*